US012596664B2

(12) United States Patent
Hong et al.

(10) Patent No.: US 12,596,664 B2
(45) Date of Patent: Apr. 7, 2026

(54) DATA PROCESSING METHOD AND ELECTRONIC DEVICE USING DMA

(71) Applicant: REBELLIONS INC., Seongnam-si (KR)

(72) Inventors: Boeui Hong, Seongnam-si (KR); Jaedon Lee, Seongnam-si (KR); Jiun Yu, Seongnam-si (KR); Hyebin Jeong, Seongnam-si (KR); Sangjun Nam, Seongnam-si (KR); Hongyun Kim, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 19/088,830

(22) Filed: Mar. 24, 2025

(65) Prior Publication Data

US 2026/0056897 A1     Feb. 26, 2026

(30) Foreign Application Priority Data

Aug. 21, 2024    (KR) ........................ 10-2024-0112063

(51) Int. Cl.
*G06F 13/28*            (2006.01)

(52) U.S. Cl.
CPC ..................................... *G06F 13/28* (2013.01)

(58) Field of Classification Search
None
See application file for complete search history.

(56) References Cited

U.S. PATENT DOCUMENTS

| | | | | | |
|---|---|---|---|---|---|
| 6,092,127 | A | * | 7/2000 | Tausheck | ................ G06F 13/28 |
| | | | | | 710/22 |
| 7,415,550 | B2 | * | 8/2008 | Tanaka | .................... G06F 13/28 |
| | | | | | 710/1 |
| 7,533,198 | B2 | * | 5/2009 | Bartley | .................. G06F 13/28 |
| | | | | | 710/25 |
| 8,285,889 | B2 | * | 10/2012 | Shinohara | .............. G06F 13/28 |
| | | | | | 710/60 |

(Continued)

FOREIGN PATENT DOCUMENTS

| | | |
|---|---|---|
| JP | 2008-547138 A | 12/2008 |
| JP | 2014-160341 A | 9/2014 |

(Continued)

OTHER PUBLICATIONS

Notice of Allowance for KR 10-2024-0112063 by Korean Intellectual Property Office dated Mar. 5, 2025.

*Primary Examiner* — Henry Tsai
*Assistant Examiner* — Christopher A Bartels
(74) *Attorney, Agent, or Firm* — BROADVIEW IP LAW, PC

(57)                    ABSTRACT

A data processing method using a DMA, the method comprising: deriving a waiting time of a waiting time of a first DMA operation for a first computation task and a waiting time of a second DMA operation for a second computation task, deriving a MO value of the first DMA operation and a MO value of the second DMA operation based on the waiting time of the first DMA operation and the waiting time of the second DMA operation, and performing the first DMA operation based on the MO value of the first DMA operation, and performing the second DMA operation based on the MO value of the second DMA operation.

20 Claims, 10 Drawing Sheets

Deriving a waiting time of a first DMA operation for a first computation task and a waiting time of a second DMA operation for a second computation task — S800

Deriving a MO value of the first DMA operation and a MO value of the second DMA operation based on the waiting time of the first DMA operation and the waiting time of the second DMA operation — S810 performing the first DMA operation based on the MO value of the first DMA operation, and performing the second DMA operation based on the MO value of the second DMA operation — S820

(56)                References Cited

U.S. PATENT DOCUMENTS

| | | | | |
|---|---|---|---|---|
| 8,321,605 | B2 * | 11/2012 | Bratt | G06F 13/28 |
| | | | | 710/22 |
| 8,892,794 | B2 * | 11/2014 | Moallem | G06F 11/25 |
| | | | | 710/62 |
| 9,128,838 | B2 * | 9/2015 | Vilela | G06F 11/2221 |
| 10,783,103 | B1 * | 9/2020 | Jain | G06F 13/28 |
| 10,983,920 | B2 * | 4/2021 | Thyamagondlu | G06F 13/28 |
| 11,847,507 | B1 * | 12/2023 | Borkovic | G06F 9/522 |
| 2008/0281999 | A1 * | 11/2008 | Kang | G06F 13/28 |
| | | | | 710/23 |
| 2011/0307233 | A1 * | 12/2011 | Tseng | G06F 30/347 |
| | | | | 703/21 |
| 2013/0031281 | A1 * | 1/2013 | Feehrer | G06F 13/28 |
| | | | | 710/23 |
| 2013/0125097 | A1 * | 5/2013 | Ebcioglu | G06F 8/4452 |
| | | | | 717/136 |
| 2015/0039944 | A1 * | 2/2015 | Vilela | G06F 11/0772 |
| | | | | 714/43 |
| 2016/0373510 | A1 * | 12/2016 | Sreevalsan | H04L 65/80 |
| 2017/0270921 | A1 * | 9/2017 | Arslan | G06F 40/247 |
| 2020/0310800 | A1 * | 10/2020 | Parra | G06F 9/30038 |
| 2020/0310993 | A1 * | 10/2020 | Kumar | G06F 3/0604 |
| 2020/0401540 | A1 * | 12/2020 | Birsan | G06F 13/28 |
| 2023/0231811 | A1 * | 7/2023 | Dalal | G06F 13/1605 |
| | | | | 710/308 |
| 2025/0103528 | A1 * | 3/2025 | Yuenyongsgool | |
| | | | | G06F 13/1673 |

FOREIGN PATENT DOCUMENTS

| | | |
|---|---|---|
| KR | 10-2008-0071840 A | 8/2008 |
| KR | 10-2015-0006266 A | 1/2015 |
| KR | 10-2019-0110869 A | 10/2019 |

* cited by examiner

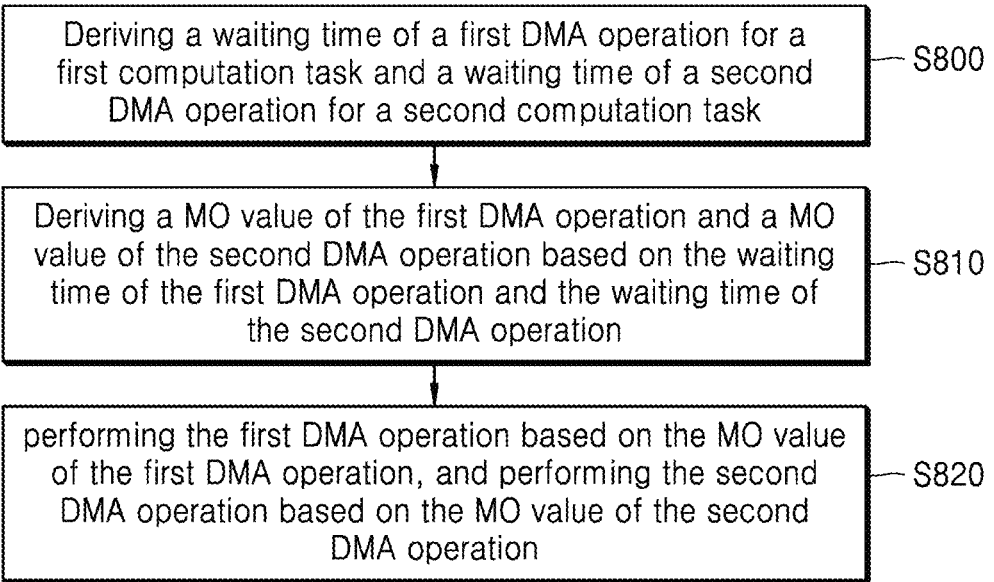

Deriving a waiting time of a first DMA operation for a first computation task and a waiting time of a second DMA operation for a second computation task — S800

Deriving a MO value of the first DMA operation and a MO value of the second DMA operation based on the waiting time of the first DMA operation and the waiting time of the second DMA operation — S810 performing the first DMA operation based on the MO value of the first DMA operation, and performing the second DMA operation based on the MO value of the second DMA operation — S820

1

DATA PROCESSING METHOD AND ELECTRONIC DEVICE USING DMA

CROSS REFERENCE TO RELATED APPLICATION

The present application claims priority to Korean Patent Application No. 10-2024-0112063, filed on Aug. 21, 2024, the entire contents of which is incorporated herein for all purposes by this reference.

TECHNICAL FIELD

The present disclosure relates to a data processing method and electronic device using Direct Memory Access (DMA) in AI service providing system.

BACKGROUND

As artificial intelligence (AI) technology advances, AI services utilizing it are becoming more widespread, and the size and complexity of data transmitted and inference work performed to support AI models such as LLM (Large Language Model) are increasing.

Accordingly, multiple DMA operations that transfer data for computation work for AI inference may be performed simultaneously, and a problem may arise in that priorities of DMA operations cannot be accurately and in real time reflected when transmitting data for computation work for AI service using the conventional method of allocating bandwidth to DMA operations.

Accordingly, there is a need for a method or system performing DMA operations to transmit urgent data with priority by reflecting the priorities of DMA operations in real time and when the DMA operations are performed simultaneously.

SUMMARY

An object of the present disclosure is to provide a data processing method and an electronic device derive MO values based on waiting times for computation tasks of DMA operations and perform DMA operations based on the derived MO values in order to solve the problems.

In order to achieve the object, a data processing method using a direct memory access (DMA), the method comprising: deriving a waiting time of a waiting time of a first DMA operation for a first computation task and a waiting time of a second DMA operation for a second computation task, deriving a Multiple Outstanding (MO) value of the first DMA operation and a MO value of the second DMA operation based on the waiting time of the first DMA operation and the waiting time of the second DMA operation, and performing the first DMA operation based on the MO value of the first DMA operation, and performing the second DMA operation based on the MO value of the second DMA operation, wherein the waiting time of the first DMA operation is derived as a sum of predicted execution times of computation tasks performed before the first computation task among waiting computation tasks, and wherein the waiting time of the second DMA operation is derived as a sum of predicted execution times of computation tasks performed before the second computation task among the waiting computation tasks.

An electronic device, comprising: a command processor (CP) that operates firmware for a direct memory access (DMA) operation, A first DMA device performing a first DMA operation between a first memory and a specific memory, and a second DMA device performing a second DMA operation between a second memory and the specific memory, wherein the CP derives a waiting time of a waiting time of the first DMA operation for a first computation task and a waiting time of the second DMA operation for a second computation task, derives a Multiple Outstanding (MO) value of the first DMA operation and a MO value of the second DMA operation based on the waiting time of the first DMA operation and the waiting time of the second DMA operation, wherein the first DMA device performs the first DMA operation based on the MO value of the first DMA operation, wherein the second DMA device performs the second DMA operation based on the MO value of the second DMA operation, wherein the waiting time of the first DMA operation is derived as a sum of predicted execution times of computation tasks performed before the first computation task among waiting computation tasks, and wherein the waiting time of the second DMA operation is derived as a sum of predicted execution times of computation tasks performed before the second computation task among the waiting computation tasks.

According to an embodiment of the present disclosure, MO values may be derived based on waiting times of DMA operations to adjust bandwidth, thereby allocating a larger bandwidth to an urgent DMA operation, thereby improving the data transfer efficiency for computation tasks.

According to an embodiment of the present disclosure, MO values may be derived by reflecting changed waiting time of the DMA operation, thereby improving the data transfer efficiency for computation tasks by reflecting the priority of the DMA operation in real time. According to an embodiment of the present disclosure, MO values may be derived by reflecting changed waiting time of the DMA operation whenever a DMA operation is completed and a new DMA operation starts, and the efficiency of performing the DMA operation may be improved by adaptively considering predicted execution time of the computation task.

BRIEF DESCRIPTION OF THE DRAWINGS

FIG. 1 is an exemplary block diagram illustrating an electronic device according to an embodiment of the present disclosure.

FIGS. 2A and 2B are exemplary block diagrams illustrating DMA performed in the electronic device in an embodiment of the present disclosure.

FIG. 8 is a flowchart for explaining in detail a DMA method of an electronic device for AI task according to an embodiment of the present disclosure.

DETAILED DESCRIPTION

Figure 3:
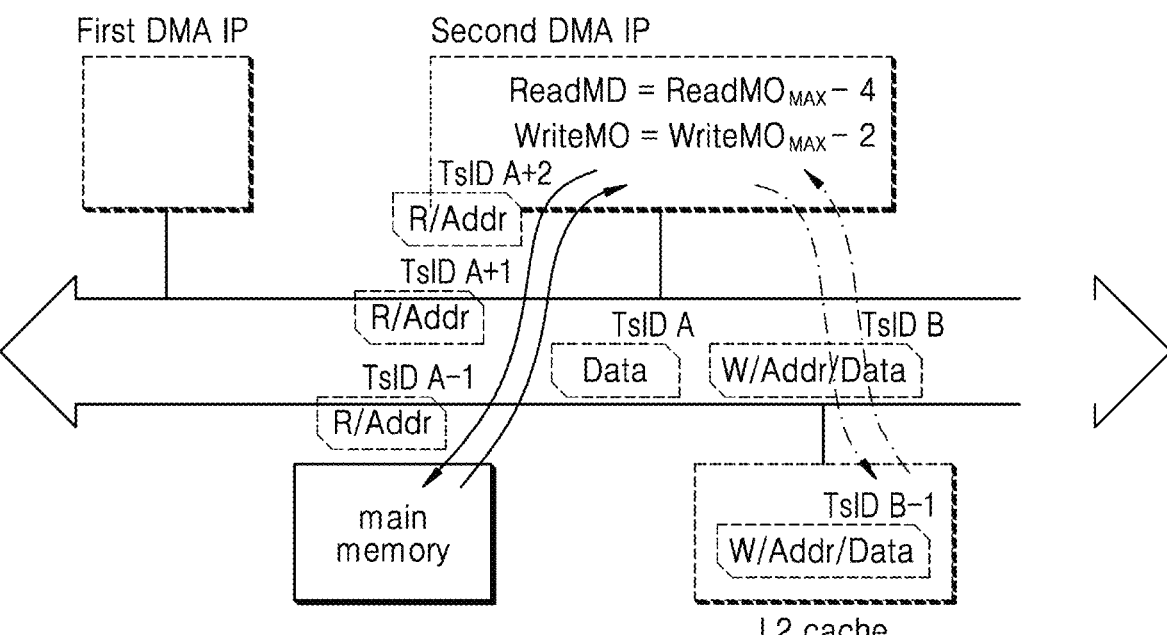
FIG. 3 is a diagram illustrating an embodiment in which DMA supporting a MO function is performed in an electronic device.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

A "module" or "unit" may be implemented as a processor and a memory, or may be implemented as a circuit (circuitry). Terms such as "circuit (circuitry)" may refer to a circuit in hardware, but may also refer to a circuit in software. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, "processor" may refer to an application-specific integrated circuit (ASIC), a programmable logic device (PLD), or a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or marking data storage, registers, and so on. The memory is said to be in electronic communication with a processor if the processor can read information from and/or write information to the memory. The memory integrated with the processor is in electronic communication with the processor.

In the present disclosure, "each of a plurality of A" may refer to each of all components included in the plurality of A, or may refer to each of some of the components included in a plurality of A.

In addition, terms such as first, second, A, B, (a), (b), etc. used in the following examples are only used to distinguish certain components from other components, and the nature, sequence, order, etc. of the components are not limited by the terms.

In addition, in the following examples, if a certain component is stated as being "connected," "combined" or "coupled" to another component, it is to be understood that there may be yet another intervening component "connected," "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

In addition, in the following examples, "determining whether it is less than" or "if it is less than" are disclosed, but "determining whether it is less than or equal to" or "if it is less than or equal to" may also be applied to the examples.

Before describing various examples of the present disclosure, terms used herein will be explained.

In the present disclosure, "instruction" may refer to a series of computer-readable commands grouped based on function, which are components of a computer program and executed by a processor.

In the present disclosure, "network" may be implemented as a wired network such as a Local Area Network (LAN), a Wide Area Network (WAN), or a Value Added Network (VAN), or any type of wireless network such as a mobile radio communication network or a satellite communication network.

Figure 1:
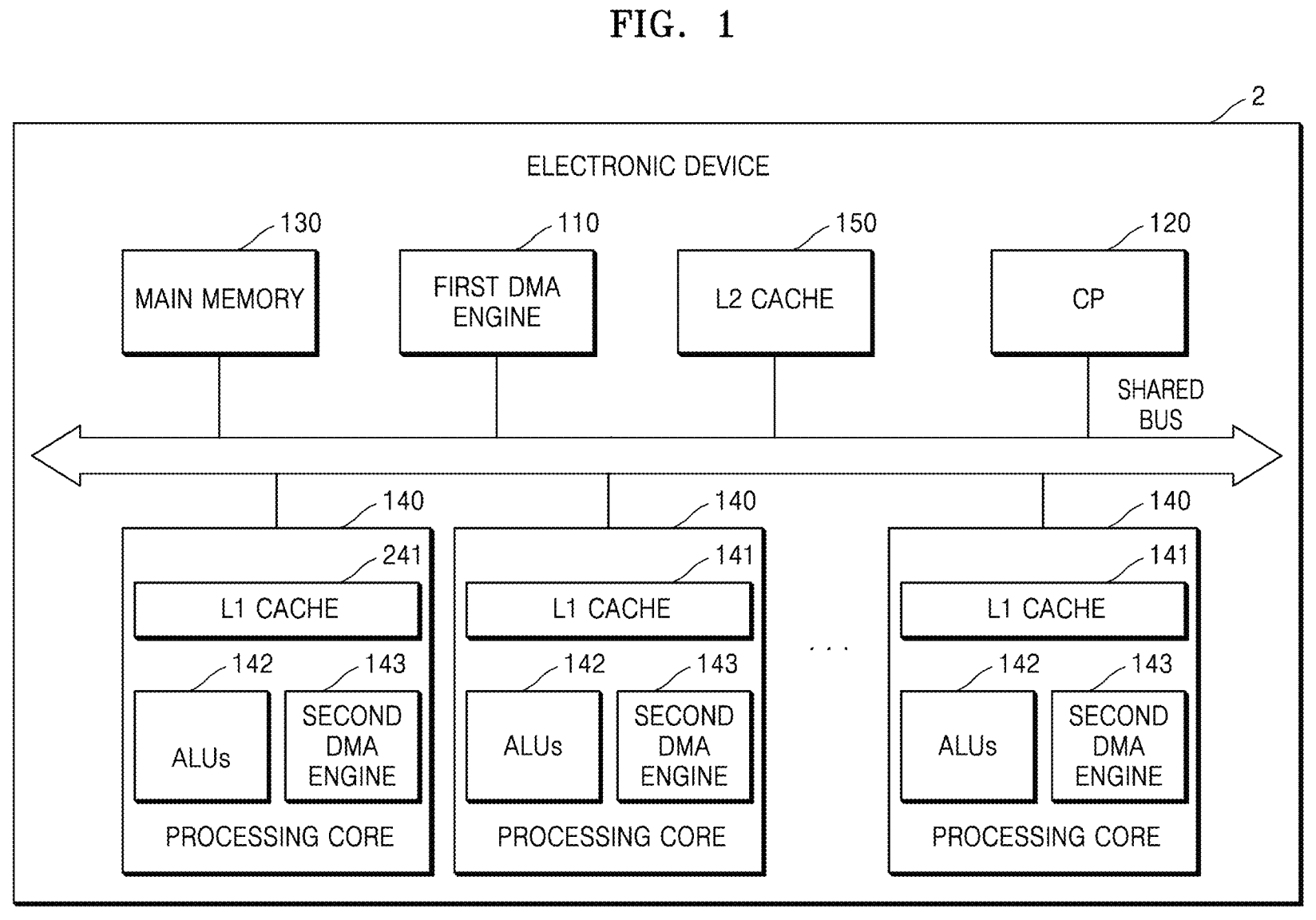

FIG. 1 is an exemplary block diagram illustrating an electronic device according to an embodiment of the present disclosure.

Referring to FIG. 1, an electronic device (1) according to an embodiment of the present disclosure may include a first DMA engine (110), a command processor (CP) (120), a main memory (130), at least one processing core (140) and/or an L2 cache (150). Here, the processing core (140) may be composed of an L1 cache (141), Arithmetic Logic Units (ALUs) (142) and/or a second DMA engine (143). In addition, the processing core (140) may include an internal buffer. The processing core (140) may be a processing device for processing an AI workload.

The first DMA engine (110) of FIG. 1 may be positioned externally, separately from the processing core (140), and the second DMA engine (143) may be positioned within the processing core (140).

In addition, for example, a capacity of a memory may be configured in the order of the main memory (130), L2 cache (150), and L1 cache (141). That is, the main memory (130) may be the memory with the highest capacity, the L2 cache (150) may be a memory with a capacity smaller than the main memory (130) but larger than the L1 cache (141), and the L1 cache (141) may be a memory with a capacity smaller than the main memory (130) and the L2 cache (150). For example, the main memory (130) may be a DRAM (Dynamic Random Access Memory), the L1 cache (141) and the L2 cache (150) may be SRAM (Static Random Access Memory), and the L1 cache (141) and the L2 cache (150) may be read/written faster than the main memory (130).

The main memory (130) and the L2 cache (150) may communicate using a shared bus. In addition, the main memory (130) and the L1 cache (141) of the processing core (140), and the L2 cache (150) and the L1 cache (141) of the processing core (140) may also communicate using the shared bus. In addition, the main memory (130) and the internal buffer of the processing core (140) may also communicate using the shared bus.

For example, in the electronic device, direct memory access (DMA) may be performed to cache and reuse previously used data in order to perform an operation task. For example, DMA may mean a function of directly accessing memory such as RAM or a storage device without going through a processing of the CPU in a peripheral device of the device to obtain necessary data. In addition, the operation task that operates the DMA may be expressed as a task.

For example, data of a certain size may be moved from the main memory (130) to the L2 cache (150) and/or the L1 cache (141). If it is necessary to move some of the data included in the main memory (130), the DMA may be used. That is, if it is necessary to move some of the data included in the main memory (130), the DMA operation may be performed.

In addition, since data located in the main memory (130) with a high capacity must be updated again after data processing for the operation task is completed, the DMA may be used. For example, data in memory space of the L2 cache (150) and/or the L1 cache (141) may be moved to memory space of the main memory (130).

For example, CP (120) may operate firmware for the DMA operation. For example, a host of the DMA operation connected to CP (120) may include general purpose CPUs, and may generate a task and/or subtask for the DMA operation based on a control signal received from the host, and may transmit the generated task and/or subtask to the DMA engine.

Figure 2A:
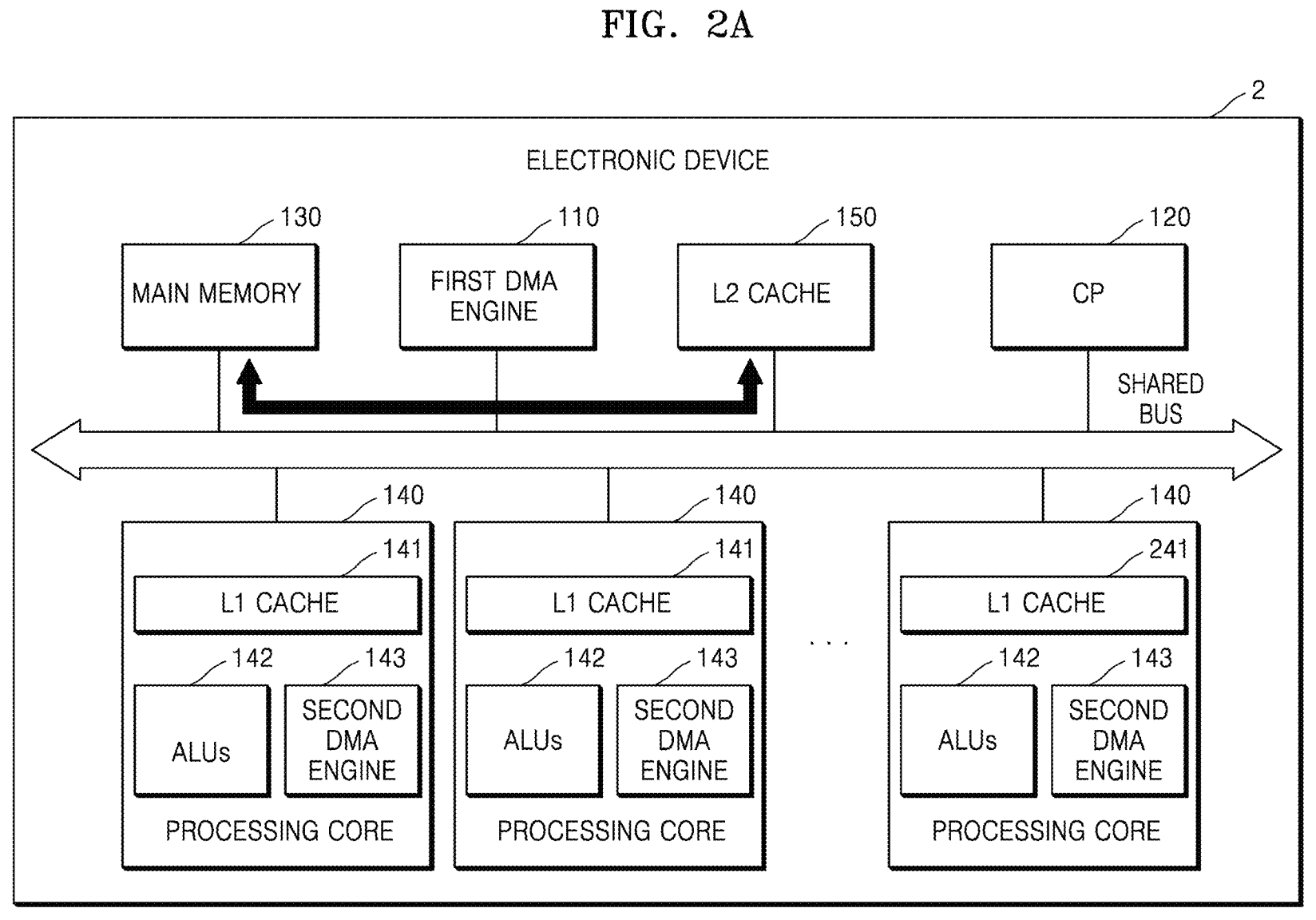
Figure 2B:
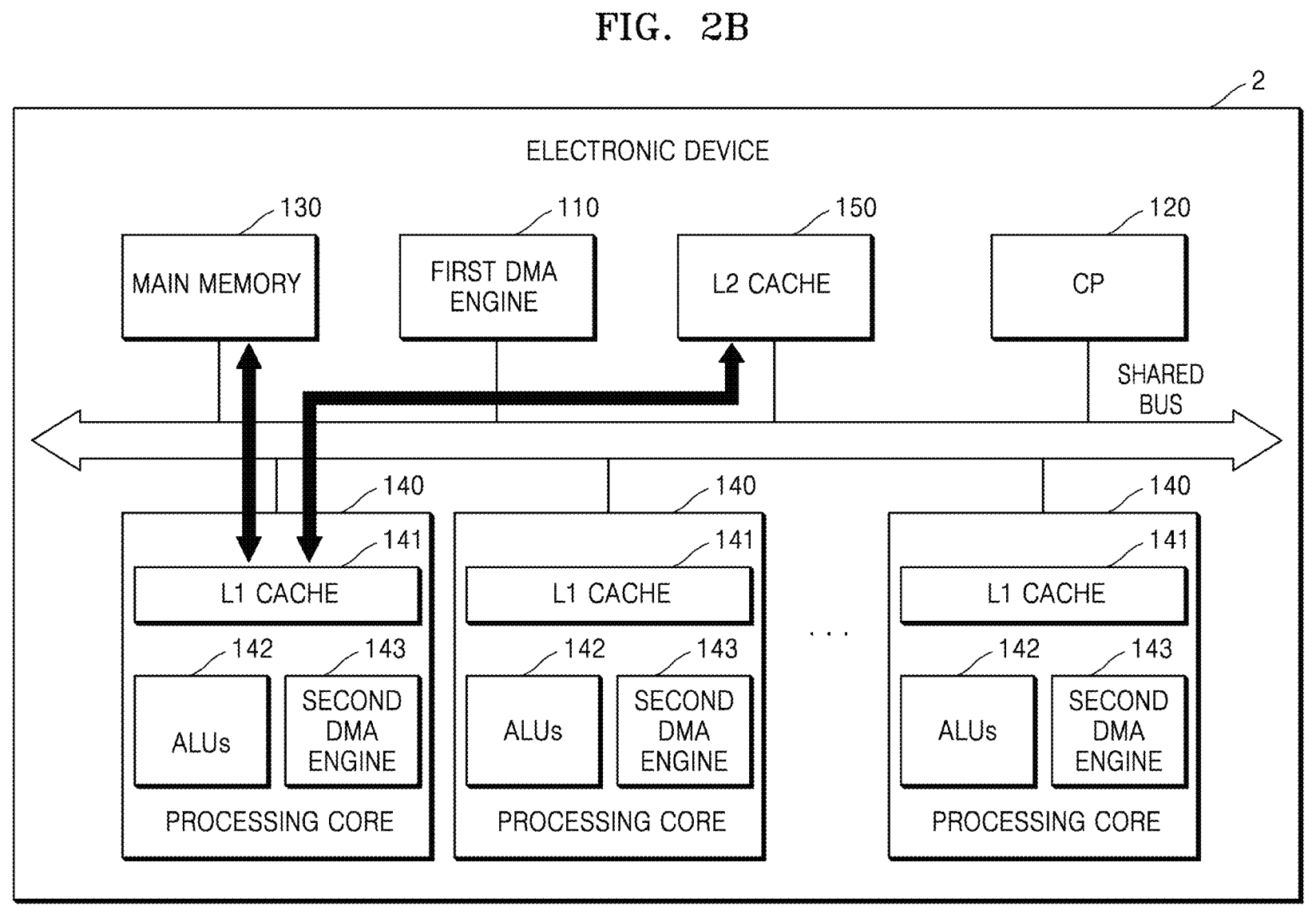

FIGS. 2A and 2B are exemplary block diagrams illustrating DMA performed in the electronic device in an embodiment of the present disclosure.

For example, referring to FIG. 2A, the first DMA engine (110) may perform bidirectional data transmission between the main memory (130) and the L2 cache (150).

For example, the first DMA engine (110) may perform a DMA operation to transmit data in the memory space of the main memory (130) to the memory space of the L2 cache (150). The first DMA engine (110) may transmit data in the memory space of the main memory (130) to the memory space of the L2 cache (150). In addition, for example, the first DMA engine (110) may perform a DMA operation to transmit data in the memory space of the L2 cache (150) to the memory space of the main memory (130). The first DMA engine (110) may transmit data in the memory space of the L2 cache (150) to the memory space of the main memory (130).

In addition, for example, referring to FIG. 2b, the second DMA engine (143) may perform bidirectional data transfer between the main memory (130) and the L1 cache (141), and may perform bidirectional data transmission between the L2 cache (150) and the L1 cache (141).

For example, the second DMA engine (143) may perform a DMA operation to transmit data in the memory space of the main memory (130) to the memory space in the L1 cache (141). The second DMA engine (143) may transmit data in the memory space of the main memory (130) to the memory space of the L1 cache (141). In addition, for example, the second DMA engine (143) may perform a DMA operation to transmit data in the memory space of the main memory (130) to the memory space of the L1 cache (141). The second DMA engine (143) may transmit data in the memory space of the main memory (130) to the memory space of the L1 cache (141).

In addition, for example, the second DMA engine (143) may perform a DMA operation to transmit data in the memory space of the L2 cache (150) to the memory space of the L1 cache (141). The second DMA engine (143) may transmit data in the memory space of the L2 cache (150) to the memory space of the L1 cache (141). In addition, for example, the second DMA engine (143) may perform a DMA operation to transmit data in the memory space of the L2 cache (150) to the memory space of the L1 cache (141). The second DMA engine (143) may transmit data in the memory space of the L2 cache (150) to the memory space of the L1 cache (141).

Meanwhile, for example, ARM's Advanced Microcontroller Bus Architecture (AMBA) may be applied as a standard bus specification for connecting and managing intelligent elements (IPs) in the electronic device. AMBA's bus types may be suggested as Advanced High-Performance Bus (AHB), Advanced Peripheral Bus (APB), and Advanced extensible Interface (AXI). Among these, the AXI protocol includes advanced functions such as the multiple outstanding address function.

The multiple outstanding address function may mean a function of providing addresses corresponding to multiple transactions at once. The multiple outstanding address function may mean sending addresses for multiple transactions sequentially through an address channel simultaneously with the transmission of data, when information is provided through an address channel and a data channel. The multiple outstanding address function may utilize empty transmission time that occurs between addresses for multiple transactions. The multiple outstanding address function may be expressed as a multiple outstanding (MO) function.

FIG. 3 is a diagram illustrating an embodiment in which DMA supporting a MO function is performed in an electronic device.

Referring to FIG. 3, a plurality of DMAs in an electronic device may be connected to an interconnect supporting a MO function. The interconnect may be the shared bus. For example, when the M.O. function is used, addresses corresponding to a plurality of data transactions may be provided simultaneously to the interconnect. In addition, a transaction ID may be used for each transaction to manage the plurality of data transactions. That is, a DMA device may transmit a plurality of data transactions for a plurality of addresses to the interconnect, and transaction IDs representing the data transactions may be used.

Meanwhile, the data transaction may include a bidirectional transaction. That is, the data transaction may include a read transaction and/or a write transaction, and MOs for the read transaction and the write transaction may be set independently.

For example, a maximum number of read MOs and a maximum number of write MOs for a DMA device may be set. The DMA device may transmit read transactions within the maximum number of read MOs and write transactions within the maximum number of write MOs. In addition, for example, when N read transactions and M write transactions are transmitted, an available read MO in the DMA device may be derived as the maximum number of read MOs-N, and an available write MO may be derived as the maximum number of write MOs-M. Thereafter, when a read is completed and a read transaction is returned, the available read MO may be increased again by the number of completed and returned read transactions. In addition, when a write is completed and a write transaction is returned, the available write MO can be increased again by the number of completed and returned write transactions.

For example, a read transaction including a read address and a transaction ID may be transmitted from a master device to a slave device via the interconnect. Thereafter, the read transaction may carry data located at the read address in the slave device and return to the master device through the interconnect. That is, the slave device can include data located at the read address included in the read transaction in the read transaction, transmit the read transaction to the master device through the interconnect, and the read MO may be returned. The read address may indicate a location of a memory space in the slave device. The read MO may be returned as an available read MO of the master device.

In addition, for example, a write transaction including a write address and a transaction ID may be transmitted from a master device to a slave device via the interconnect. Thereafter, the write transaction may transfer data to the write address in the slave device and return to the master device through the interconnect. That is, the data of the right transaction may be moved to the right address in the slave device. The slave device may move the data to the write address included in the write transaction, transmit the write transaction to the master device through the interconnect, and the write MO may be returned. The write address may indicate a location of a memory space in the slave device. The write MO may be returned to an available write MO of the master device.

For example, referring to FIG. 3, a DMA operation supported by the MO function may be performed from the second DMA IP to the main memory, and a DMA operation supported by the MO function may be performed from the second DMA IP to the L2 cache. For example, as illustrated in FIG. 3, a read operation of DMA may be performed from the second DMA IP to the main memory, and a write operation of DMA may be performed from the second DMA IP to the L2 cache.

For example, the maximum number of Read MOs and the maximum number of Write MOs that the second DMA IP can use may be set. Read $MO_{MAX}$ of the second DMA IP illustrated in FIG. 3 may represent the maximum number of Read MOs of the second DMA IP, and Write $MO_{MAX}$ of the second DMA IP can represent the maximum number of Write MOs of the second DMA IP.

For example, the second DMA IP may transmit four read transactions and two write transactions to the interconnect. Each of the read transactions and the write transactions may include a transaction ID. For example, transaction IDs of the four read transactions may be TsID A−1 to A+2, and the transaction IDs of the two write transactions may be TsID B−1 to B.

Thereafter, the available read MO of the second DMA IP may be derived as Read $MO_{MAX}$−4, and the available write MO of the second DMA IP may be derived as Write $MO_{MAX}$−2. Read MO of the second DMA IP illustrated in FIG. 3 may represent the number of available rea. MOs of the second DMA IP, and Write MO of the second DMA IP may represent the number of available write MOs of the second DMA IP. That is, for example, Read MO of the second DMA IP may be derived as Read $MO_{MAX}$−4, and Write MO may be derived as Write $MO_{MAX}$−2.

A read transaction of the second DMA IP may include a read address and a transaction ID of the read transaction, and the read transaction including the read address and the transaction ID may go out through the interconnect. The read transaction including the read address and the transaction ID may move from the second DMA IP to the main memory through the interconnect, and may return to the second DMA IP through the interconnect, including data located at the read address. That is, the main memory may include data located at the read address included in the read transaction in the read transaction, and transmit the read transaction to the second DMA IP through the interconnect.

For example, as illustrated in FIG. 3, a read transaction with a transaction ID of TsID A of the second DMA IP may be returned when a read operation is completed. That is, the read transaction with the transaction ID of TsID A may be transferred to the main memory through the interconnect and then transferred to the second DMA IP, including data located at the read address of the main memory. An address of the data located in the main memory may be a read address included in the read transaction with the transaction ID of TsID A. When the read operation is completed and the read transaction with the transaction ID of TsID A is returned, the available read MO of the second DMA IP may be derived as Read $MO_{MAX}$−3.

In addition, for example, a write transaction of the second DMA IP may include a read address, data, and a transaction ID of the write transaction, and the write transaction including the read address, the data, and the transaction ID may go out through the interconnect. The write transaction including the read address, the data, and the transaction ID may move from the second DMA IP to the L2 cache through the interconnect, and may transfer the data to the read address of the L2 cache, and the write transaction may return to the second DMA IP through the interconnect. That is, the L2 cache may move the data to the read address included in the write transaction, and may transfer the write transaction to the second DMA IP through the interconnect.

For example, a write transaction with a transaction ID of TsID B–1 of the second DMA IP may be returned when the write operation is completed. That is, the write transaction with the transaction ID of TsID B–1 may be transferred to the L2 cache through the interconnect, and may transfer data to the write address of the L2 cache and return to the second DMA IP. When the write operation is completed and the write transaction with the transaction ID of TsID B–1 is returned, the available write MO of the second DMA IP may be derived as Write $MO_{MAX}-1$.

Meanwhile, multiple master devices may perform DMA operations to a single slave device simultaneously. In this case, competition for use of the slave device may occur among the master devices, and a bandwidth of the slave device may be divided and used by the multiple master devices.

Figure 4:
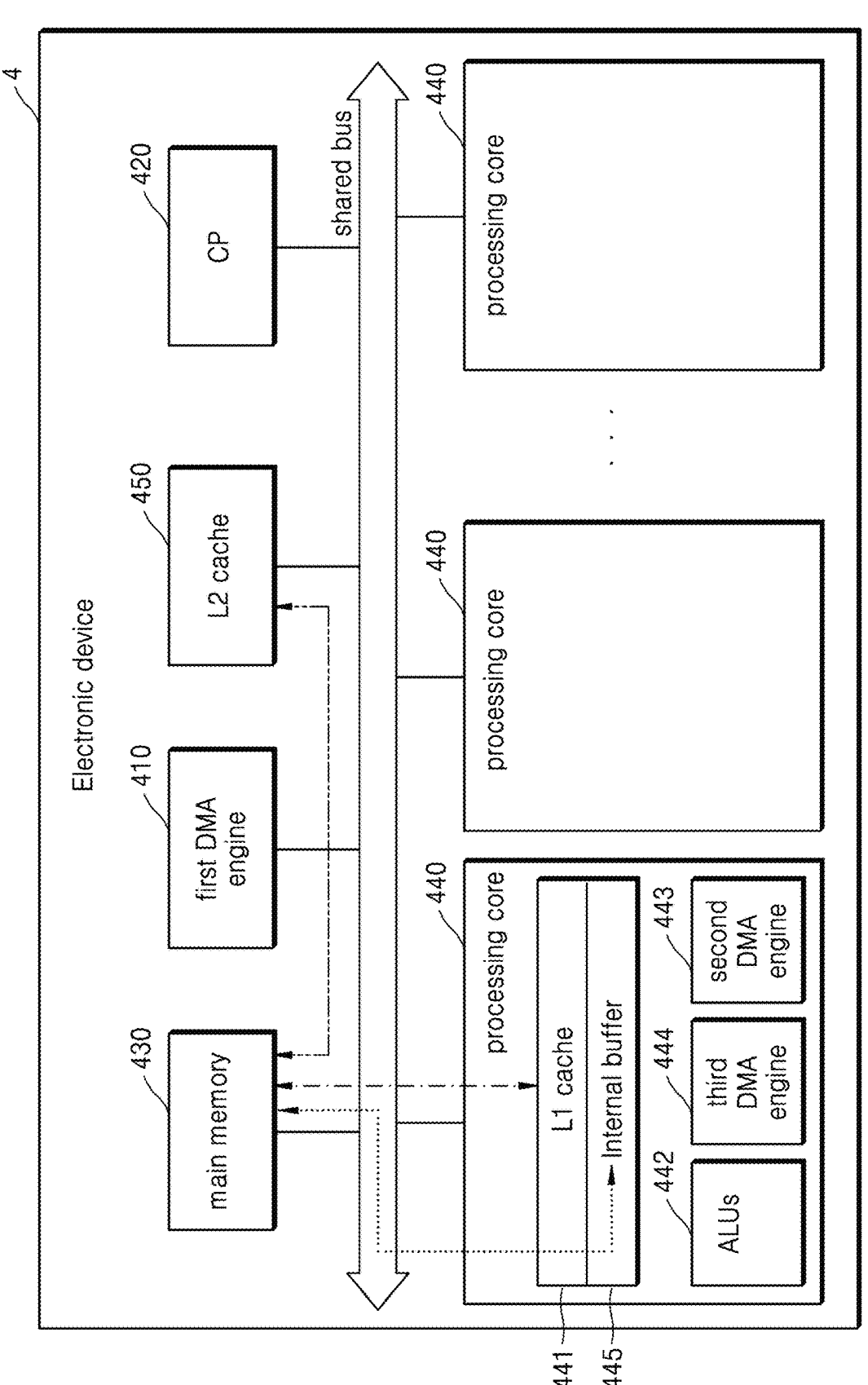
FIG. 4 is a diagram illustrating an embodiment in which multiple DMA devices simultaneously perform DMA operations to main memory.

FIG. 4 is a diagram illustrating an embodiment in which multiple DMA devices simultaneously perform DMA operations to main memory.

Referring to FIG. 4, an electronic device (4) according to an embodiment of the present disclosure may include a first DMA engine (410), a command processor (CP) (420), a main memory (430), at least one processing core (440), and/or an L2 cache (450). Here, the processing core (440) may be composed of an L1 cache (441), arithmetic logic units (ALUs) (442), a second DMA engine (443), a third DMA engine (444), and/or an internal buffer (445).

Referring to FIG. 4, a first DMA device, a second DMA device, and a third DMA device may simultaneously access the main memory (430) to perform a DMA operation. For example, the first DMA device may perform a DMA operation between the main memory (430) and the L2 cache (450), the second DMA device may perform a DMA operation between the main memory (430) and the L1 cache (441), and the third DMA device may perform a DMA operation between the main memory (430) and the internal buffer (445).

Accordingly, a bandwidth of the main memory may be allocated to the first DMA device, the second DMA device, and the third DMA device. For example, the bandwidth of the main memory may be allocated by adjusting the number of available MOs for each of the first DMA device, the second DMA device, and the third DMA device. For example, the bandwidth may be allocated based on priorities for DMA operations performed in the first DMA device, the second DMA device, and the third DMA device.

However, since DMA operations divide a limited bandwidth, when a specific task is performed, completion times of other tasks in operation at the same time may be delayed, and therefore, it is necessary to ensure a DMA operation for an urgent task is performed first.

Accordingly, the present disclosure proposes a method for adjusting the number of MOs for DMA operations based on time at which data transmitted by a DMA operation will be used, so that a DMA operation for an urgent task may be performed first. The time at which data transferred by a DMA operation will be used may be derived as a waiting time of a task for the DMA operation. In addition, even while performing a specific DMA operation, the time at which data transmitted by the specific DMA operation is to be used may change due to reasons such as completion of tasks for other DMA operations. Therefore, the present disclosure proposes a method for adjusting the number of MOs of multiple DMA devices based on waiting times of tasks of DMA operations performed at each operation point of the DMA operations for the multiple DMA devices.

Figure 5:
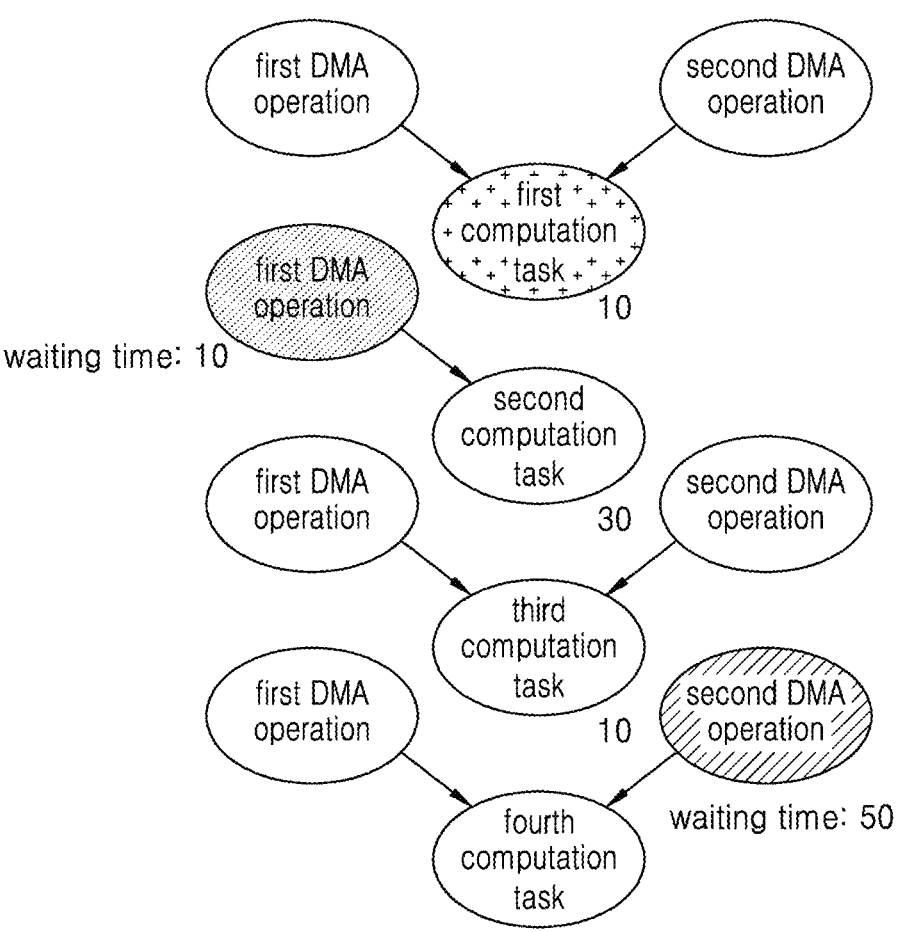
FIG. 5 is a diagram illustrating an embodiment in which DMA operations for a first DMA device and DMA operations for a second DMA device are performed.

FIG. 5 is a diagram illustrating an embodiment in which DMA operations for a first DMA device and DMA operations for a second DMA device are performed. As illustrated in FIG. 5, DMA operations may be performed in a top-down direction. In the electronic device, operations may be performed in the order of a first computation task to a fourth computation task. Therefore, it may be performed in the order of a DMA operation for the first computation task to a DMA operation for the fourth computation task.

For example, as illustrated in FIG. 5, the first DMA device may perform a DMA operation for a first computation task, a DMA operation for a second computation task, a DMA operation for a third computation task, and a DMA operation for a fourth computation task. The DMA operation of the first DMA device may be referred to as a first DMA operation. That is, the first DMA device may perform a first DMA operation for the first computation task, a first DMA operation for the second computation task, a first DMA operation for the third computation task, and a first DMA operation for the fourth computation task.

In addition, for example, the second DMA device may perform a DMA operation for the first computation task, a DMA operation for the third computation task, and a DMA operation for the fourth computation task. The DMA operation of the second DMA device may be referred to as a second DMA operation. That is, the second DMA device may perform a second DMA operation for the first computation task, a second DMA operation for the third computation task, and a second DMA operation for the fourth computation task.

For example, at the time when the first DMA operation or the second DMA operation starts, a MO value (i.e., the number of MOs) for the first DMA device and a MO value for the first DMA device may be derived based on a waiting time of a computation task for the first DMA operation and a waiting time of a computation task for the second DMA operation. For example, the MO value of a DMA operation for a larger waiting time may be adjusted based on the waiting time of the computation task for the first DMA operation and the waiting time of the computation task for the second DMA operation. Through this, a number of transactions of the second DMA operation may be reduced by an adjusted MO value so that an adjusted bandwidth may be allocated, and since a number of transactions of the first DMA operation has no separate limitation, a bandwidth other than the adjusted bandwidth for the second DMA operation may be allocated, so that a larger bandwidth may be allocated to an urgent DMA operation.

Meanwhile, a waiting time for a computation task may be derived as a sum of predicted execution times of computation tasks performed prior to the computation task. The predicted execution times of computation tasks may be collected through simulation and transmitted to the CP.

For example, the predicted execution time of the computation task may be collected through cycle accurate simulation. Specifically, a cycle accurate simulation for performance prediction may be performed during the hardware design process, and the predicted execution time collected from the cycle accurate simulation may be transferred to CP and used to derive a waiting time for the computation task.

Alternatively, as another example, a predicted execution time of a computation task may be derived as a value calculated by dividing an operation workload of the computation task by a performance of a calculator (e.g., an AI accelerator). In this case, the waiting time for the computation task may not be calculated very accurately, but it can be calculated and derived quickly. Specifically, for example, an input value [n, m] may be multiplied by kernel data [m, k] to derive dot ([n, m], [m, k]), a bias value of size [k] may be element-wise added to the derived dot ([n, m], [m, k]) n times, and a non-linear function may be applied n times to derive a final output value. The final output value may represent an amount of an operation workload of the computation task. For example, the final output value may be [n×m×k]+[n×k]+[n] or an approximate value of [n×m×k]. The predicted execution time of the computation task may be derived by dividing the final output value representing the operation workload of the computation task by TFLOPS/ TOPS representing a computation speed of the AI accelerator. CP may derive the predicted execution time of the computation task by dividing the operation workload of the computation task by the computation speed of the AI accelerator, and may derive the waiting time for the computation task based on the predicted execution time.

For example, a predicted execution time of a first computation task may be 10, a predicted execution time of a second computation task may be 30, and a predicted execution time of a third computation task may be 10. Accordingly, for example, a waiting time of the second computation task may be derived as 10, which is the predicted execution time of the first computation task, a waiting time of the third computation task may be derived as 40, which is the sum of the predicted execution time of the first computation task and the predicted execution time of the second computation task, and a waiting time of the fourth computation task may be derived as 50, which is the sum of the predicted execution time of the first computation task, the predicted execution time of the second computation task, and the predicted execution time of the third computation task.

For example, in the first DMA device, a first DMA operation for the second computation task may be performed, and in the second DMA device, a second DMA operation for the fourth computation task may be started. In this case, a MO value for the first DMA device and a MO value for the second DMA device may be derived based on the waiting time of the second computation task and the waiting time of the fourth computation task. For example, the MO value for the first DMA device and the MO value for the second DMA device may be derived based on a ratio of the waiting time of the second computation task and the waiting time of the fourth computation task. For example, the MO value for the first DMA device and the MO value for the second DMA device may be assigned as a ratio of a reciprocal of the waiting time of the second computation task and a reciprocal of the waiting time of the fourth computation task.

Specifically, for example, since the waiting time of the second computation task is 10 and the waiting time of the fourth computation task is 50, a ratio of the waiting time of the second computation task and the waiting time of the fourth computation task may be 1:5, and the MO value for the first DMA device and the MO value for the second DMA device may be assigned at the ratio of 5:1.

For example, the MO value for the first DMA device may be derived as $\frac{5}{6}$ of a maximum MO value of the first DMA operation, and the MO value for the second DMA device may be derived as $\frac{1}{6}$ of a maximum MO value of the second DMA operation. Here, the maximum MO value may also be expressed as an initial MO value.

Alternatively, as an example, the MO value of the second DMA operation having a larger waiting time among the waiting time of the computation task for the first DMA operation and the waiting time of the computation task for the second DMA operation may be adjusted by a ratio of the reciprocal of the waiting time of the second computation task and the reciprocal of the waiting time of the fourth computation task, and the MO value of the first DMA operation having the smaller waiting time may not be adjusted. For example, the MO value for the first DMA device may be derived as the maximum MO value (i.e., the initial MO value) of the first DMA operation, and the MO value for the second DMA device may be derived as $\frac{1}{6}$ of the maximum MO value of the second DMA operation. Through this, a number of transactions of the second DMA operation is reduced to $\frac{1}{6}$ of a number of transactions for the initial MO value, so that a bandwidth of $\frac{1}{6}$ of the maximum bandwidth may be allocated, and since a number of transactions of the first DMA operation has no separate limitation, a bandwidth of $\frac{5}{6}$ other than the adjusted bandwidth for the second DMA operation may be allocated, so that a larger bandwidth may be allocated to the urgent first DMA operation.

For example, a MO value of a nth DMA operation for a nth DMA device for a specific memory may be derived as in the following equation.

$$MO_n = MOmax_n \times \frac{\dfrac{1}{waitingtime_n}}{\sum_{i=1}^{N} \dfrac{1}{waitingtime_i}} \qquad \text{[Equation 1]}$$

Here, N may represent a total number of DMA operations for the specific memory. In addition, $MO_n$ may represent a MO value of a nth DMA operation for a nth DMA device, $MO_{max_n}$ may represent a maximum MO value of the nth DMA operation for the nth DMA device, and $waitingtime_n$ may represent a waiting time of a computation task for the nth DMA operation.

As shown in the equation 1, the MO value of the nth DMA operation for the nth DMA device may be derived by multiplying the maximum MO value of the nth DMA operation by a value obtained by dividing a reciprocal of the waiting time of the nth DMA operation by the sum of the reciprocals of the waiting times of the DMA operations.

Alternatively, for example, waiting times of a plurality of DMA operations may be derived, and only a DMA operation having a smallest waiting time among the waiting times of the plurality of DMA operations may be performed. That is, for example, waiting times of a plurality of DMA operations can be derived, and MO values for DMA operations other than the DMA operation having the smallest waiting time among the waiting times of the plurality of DMA operations may be derived as 0. For example, if the waiting time of the nth DMA operation among the plurality of DMA operations is the smallest, MO values of DMA operations other than the nth DMA operation may be derived as 0. For example, since the waiting time of the second computation task is 10 and the waiting time of the fourth computation task is 50, the MO value of the second DMA operation may be derived as 0.

Alternatively, for example, waiting times of a plurality of DMA operations may be derived, priorities of the plurality of DMA operations may be derived based on the waiting times, and MO values of the plurality of DMA operations may be derived based on the priorities. Specifically, for example, since a waiting time of the second computation task is 10 and a waiting time of the fourth computation task is 50, a priority of the first DMA operation may be derived as a first priority, and a priority of the second DMA operation may be derived as a second priority. Thereafter, a MO value of the first DMA operation may be derived as a value obtained by multiplying a maximum MO value of the first DMA operation by a MO allocation ratio value of the first priority, and a MO value of the second DMA operation may be derived as a value obtained by multiplying a maximum MO value of the second DMA operation by a MO allocation ratio value of the second priority. The MO allocation ratio value of the first priority and the MO allocation ratio value of the second priority may be preset values.

Figure 6:
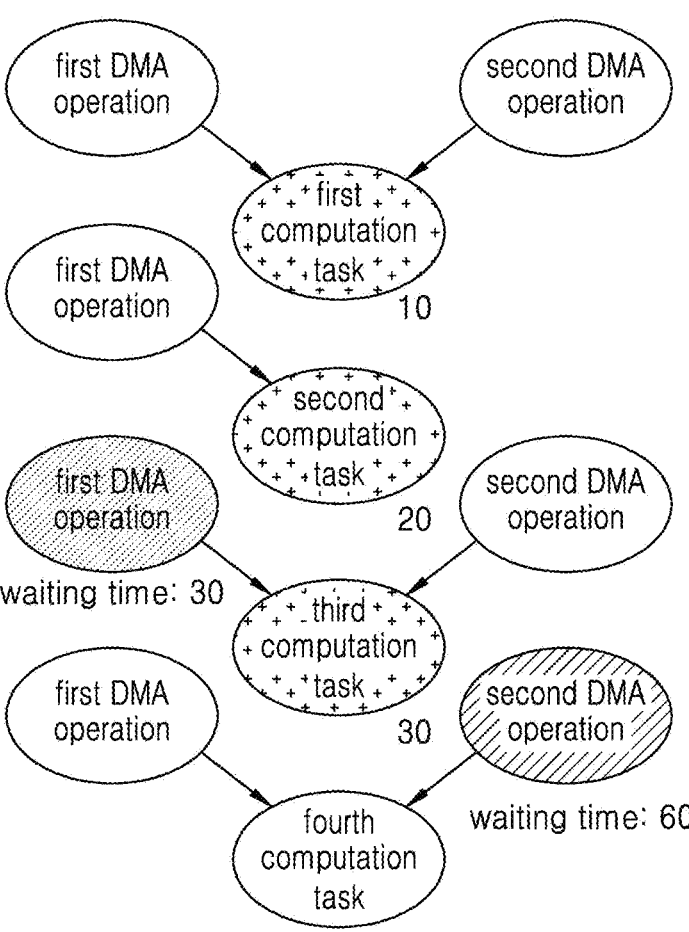
FIG. 6 is a diagram illustrating an embodiment in which DMA operations are performed by updating a waiting time of a first DMA operation and a waiting time of a second DMA operation at the time the DMA operation starts.

FIG. 6 is a diagram illustrating an embodiment in which DMA operations are performed by updating a waiting time of a first DMA operation and a waiting time of a second DMA operation at the time the DMA operation starts.

For example, referring to FIG. 6, in the first DMA device, the first DMA operation for the second computation task may be completed and the first DMA operation for the third computation task may be started, and in the second DMA device, the second DMA operation for the fourth computation task may be performed. In this case, since a computation task for the first DMA operation changes, a waiting time for the computation task of the first DMA operation also changes. Thus, for example, a MO value for the first DMA device and a MO value for the second DMA device may be re-derived based on waiting times of changed computation tasks. That is, a waiting time of the first DMA operation and a waiting time of the second DMA operation may be updated, and the MO value for the first DMA device and the MO value for the second DMA device may be derived based on the updated waiting time of the first DMA operation and the updated waiting time of the second DMA operation.

For example, the MO value for the first DMA device and the MO value for the second DMA device may be derived based on a waiting time of the third computation task and a waiting time of the fourth computation task. That is, the MO value for the first DMA device and the MO value for the second DMA device may be derived based on a ratio of the waiting time of the third computation task and the waiting time of the fourth computation task. For example, the MO value for the first DMA device and the MO value for the second DMA device can be assigned as the ratio of a reciprocal of the waiting time of the third computation task and a reciprocal of the waiting time of the fourth computation task.

Specifically, for example, since the waiting time of the third computation task is 30 and the waiting time of the fourth computation task is 60, the ratio of the waiting time of the third computation task and the waiting time of the fourth computation task may be 1:2, and the MO value for the first DMA device and the MO value for the second DMA device may be assigned at a ratio of 2:1.

For example, the MO value for the first DMA device may be derived as ⅔ of a maximum MO value of the first DMA operation, and the MO value for the second DMA device may be derived as ⅓ of a maximum MO value of the second DMA operation.

Alternatively, as an example, the MO value of the second DMA operation having a larger waiting time among the waiting time of the computation task for the first DMA operation and the waiting time of the computation task for the second DMA operation may be adjusted by a ratio of a reciprocal of the waiting time of the third computation task and a reciprocal of the waiting time of the fourth computation task, and the MO value of the first DMA operation having a smaller waiting time may not be adjusted. For example, the MO value for the first DMA device may be derived as a maximum MO value of the first DMA operation (i.e., an initial MO value), and the MO value for the second DMA device may be derived as ⅓ of a maximum MO value of the second DMA operation. Through this, a number of transactions of the second DMA operation is reduced to ⅓ of a number of transactions for the initial MO value, so that ⅓ of a bandwidth compared to the maximum bandwidth may be allocated, and since there is no separate limit to a number of transactions of the first DMA operation, ⅔ of the bandwidth other than the adjusted bandwidth for the second DMA operation may be allocated, so that a larger bandwidth may be allocated to the urgent first DMA operation.

Alternatively, for example, only a DMA operation having the smallest waiting time among waiting times of the plurality of DMA operations may be performed. For example, since the waiting time of the third computation task is 30 and the waiting time of the fourth computation task is 60, the MO value of the second DMA operation may be derived as 0.

Alternatively, for example, waiting times of a plurality of DMA operations may be derived, priorities of the plurality of DMA operations may be derived based on the waiting times, and MO values of the plurality of DMA operations may be derived based on the priorities. Specifically, for example, since the waiting time of the third computation task is 30 and the waiting time of the fourth computation task is 60, the priority of the first DMA operation may be derived as a first priority, and the priority of the second DMA operation can be derived as a second priority. Then, the MO value of the first DMA operation may be derived as a value obtained by multiplying a maximum MO value of the first DMA operation by a MO allocation ratio value of the first priority, and the MO value of the second DMA operation may be derived as a value obtained by multiplying a maximum MO value of the second DMA operation by a MO allocation ratio value of the second priority. The MO allocation ratio value of the first priority and the MO allocation ratio value of the second priority may be preset values.

In addition, for example, a method may be proposed to allow an urgent DMA operation to monopolize bandwidth, when a difference between computation tasks for DMA operations of DMA devices exceeds a threshold value. For example, when a plurality of DMA operations are requested for a specific memory, it may be determined whether a difference between a smallest waiting time and a second smallest waiting time among waiting times for the DMA operations is larger than a threshold value, and when the difference between the smallest waiting time and the second smallest waiting time is larger than the threshold value, only a DMA operation for the smallest waiting time may be performed, and performance of other DMA operations may be stopped.

For example, when a first DMA operation of a first DMA device and a second DMA operation of a second DMA device are requested for a specific memory, it can be determined whether a difference between a waiting time for the first DMA operation and a waiting time for the second DMA operation is greater than a threshold value. If the difference between the waiting time for the first DMA operation and the waiting time for the second DMA operation is greater than the threshold value, only a DMA operation having a smaller waiting time among the first DMA operation and the second DMA operation may be performed, performing another DMA operation may be stopped. That is, a MO value of a DMA operation having a larger waiting time among the first DMA operation and the second DMA operation may be set to 0. Through this, data transfer of other DMA devices except for a DMA device processing the DMA operation for the most urgent computation task may be stopped in the middle, allowing a more urgent DMA operation to monopolize the bandwidth of the memory.

Meanwhile, a maximum MO value (i.e., an initial MO value) of a DMA operation of a DMA device may be set based on the time at which a transaction of the DMA operation returns. For example, if the time required for a transaction originating from the DMA device to return to the DMA device via the slave device is N cycles, the maximum MO value of the DMA operation may be set to N. Here, the cycle may be based on the clock of the DMA device.

If the maximum MO value is set based on the time during which a DMA operation is performed, there is no risk of the maximum speed of DMA operation not being achieved due to insufficient MO counts even if a transaction is triggered every clock cycle. In addition, for example, a maximum read MO value for a read operation of the DMA of the DMA device and a maximum write MO value for a write operation of the DMA may be set respectively. The maximum read MO value may be set in consideration of a turn around latency of a memory system that is the target of the read operation, and the maximum write MO value may be set in consideration of a turn around latency of a memory system that is the target of the write operation. When the maximum MO value is set based on the time during which a DMA operation is performed, the DMA operation may be set to use a maximum bandwidth.

Figure 7A:
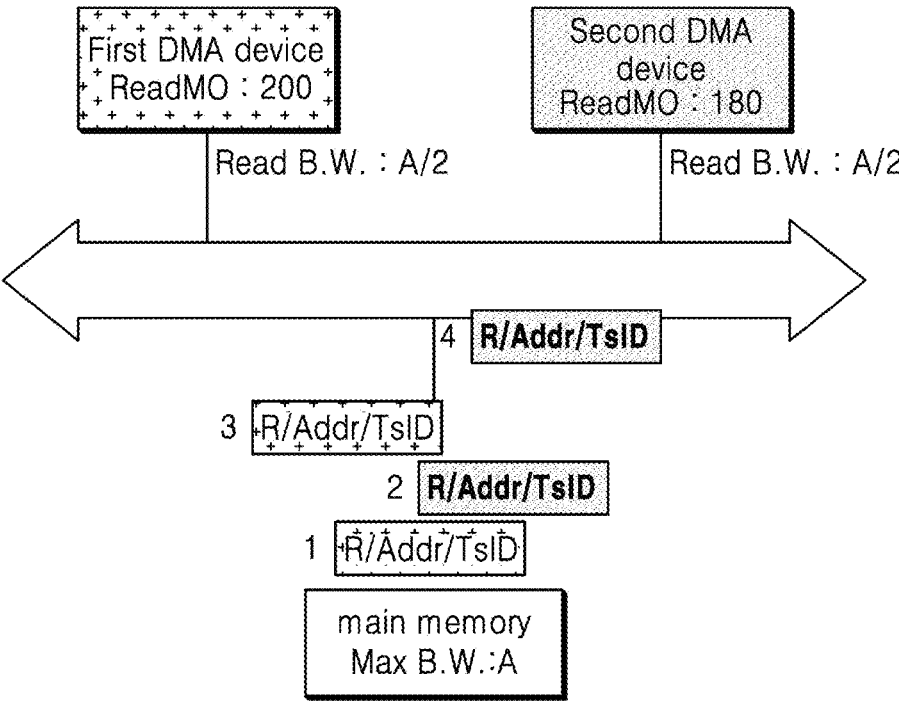
FIGS. 7A and 7B are diagrams illustrating an embodiment of allocating bandwidth by adjusting MO values for DMA operations based on a waiting time of a first DMA operation and a waiting time of a second DMA operation at the time the DMA operation starts.
Figure 7B:
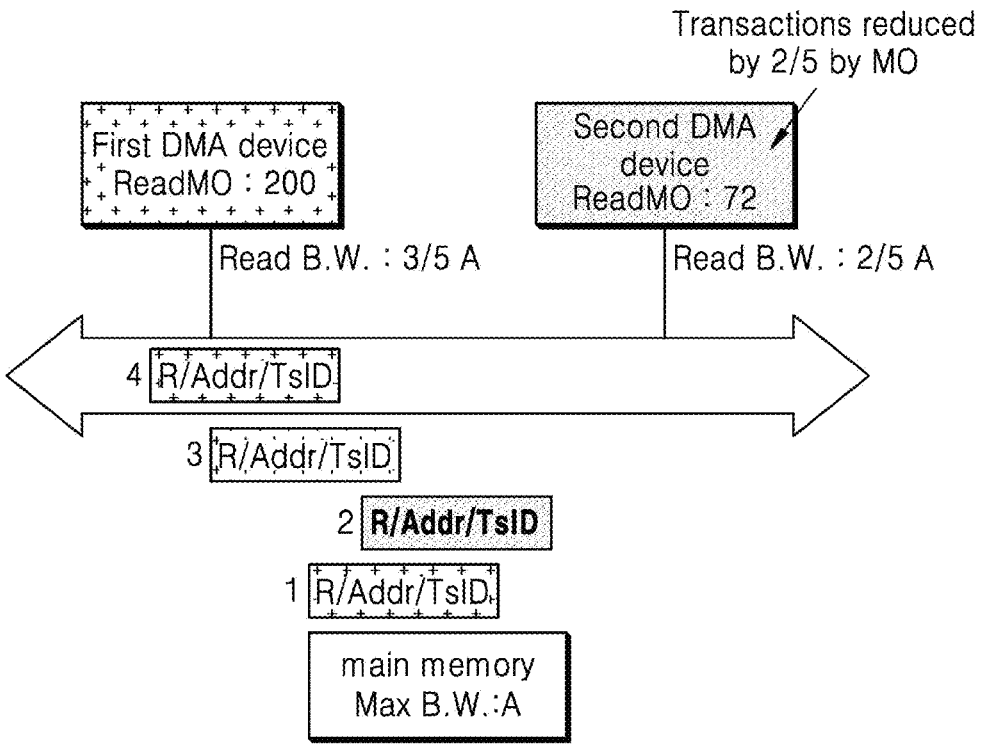

FIGS. 7A and 7B are diagrams illustrating an embodiment of allocating bandwidth by adjusting MO values for DMA operations based on a waiting time of a first DMA operation and a waiting time of a second DMA operation at the time the DMA operation starts.

Referring to FIG. 7A, a read bandwidth of the main memory may be allocated without specifying priorities for the first DMA device and the second DMA device. For example, the maximum read bandwidth that the first DMA device and the second DMA device can obtain may be determined by a maximum bandwidth provided by the main memory and/or a policy of the main memory for processing read operation requests from the first DMA device and the second DMA device.

For example, the policy of the main memory may be designed to process requests from the first DMA device and the second DMA device in a rotating manner. Accordingly, if a read bandwidth of the main memory is A, initial bandwidths allocated to the first DMA device and the second DMA device may be derived as A/2, respectively.

In addition, for example, MO values for the first DMA device and the second DMA device may be set in consideration of the transaction turnaround time of the main memory. That is, for example, it may be set so that a read transaction may be sent per cycle from each of the first DMA device and the second DMA device. For example, the maximum MO value of the first DMA device may be derived as 200, and the maximum MO value of the second DMA device may be derived as 180.

FIG. 7B may represent an embodiment in which the read bandwidth of the main memory allocated is adjusted according to the waiting time ratio of the first DMA device and the second DMA device. For example, a ratio of the waiting time of the first DMA device and the waiting time of the second DMA device may be 2:3, and therefore, a ratio of a reciprocal of the waiting time of the first DMA device and a reciprocal of the waiting time of the second DMA device, which indicates the priority, may be 3:2.

In this case, for example, the MO value for the second DMA device having the larger waiting time, i.e., the second DMA device having the lower priority, may be adjusted as illustrated in FIG. 7B. For example, the MO value of the second DMA device may be derived as 72, which is a value obtained by multiplying $2/5$ by the maximum MO value of 180. Through this, a number of read transactions that the second DMA device may transfer to the main memory may be limited to $2/5$, and therefore, a read bandwidth of $2/5*A$ may be allocated to the second DMA device. Meanwhile, since there is no separate limit on transactions for the first DMA device, data may be transmitted with a read bandwidth of $3/5*A$ excluding the read bandwidth of $2/5*A$ allocated to the second DMA device. That is, the read bandwidth of $3/5*A$ may be allocated to the first DMA device.

Meanwhile, although the embodiment is described with respect to two DMA devices, it is not limited thereto and can be equally applied to other numbers of DMA devices.

For example, if three DMA devices perform DMA operations to the main memory, and the ratio of the reciprocal of the waiting time of the first DMA device, the reciprocal of the waiting time of the second DMA device, and the reciprocal of the waiting time of the third DMA device, which indicate priorities, is 5:3:2, the MO value of the first DMA device is not limited and may be derived as the maximum MO value, the MO value of the second DMA device may be derived as the maximum MO value multiplied by $3/10$, and the MO value of the third DMA device may be derived as the maximum MO value multiplied by $2/10$. Through this, a number of transactions from the second DMA device and the third DMA device to the main memory may be reduced to $3/10$ and $2/10$ of the initial number, respectively, and the effect of bandwidth being limited at the same rate may be obtained. In addition, the first DMA device may monopolize all bandwidth except for the reduced bandwidths of the second DMA device and the third DMA device.

FIG. 8 is a flowchart for explaining in detail a DMA method of an electronic device for AI task according to an embodiment of the present disclosure.

A command processor of an electronic device derives a waiting time of a first DMA operation for a first computation task and a waiting time of a second DMA operation for a second computation task (S800).

For example, the first DMA operation may be an operation in which data for the first computation task is transferred between a first memory and a specific memory by a first DMA device, and the second DMA operation may be an operation in which data for the second computation task is transferred between a second memory and the specific memory by a second DMA device.

For example, the electronic device may include a command processor (CP) that operates firmware for a direct memory access (DMA) operation, a first DMA device that performs a first DMA operation between a first memory and a specific memory, and a second DMA device that performs a second DMA operation between a second memory and the specific memory. In addition, for example, the electronic device may include the first memory, the second memory, and the specific memory. In addition, for example, the electronic device may further include a DMA device other than the first DMA device and the second DMA device.

For example, the first DMA device and/or the second DMA device may be a DMA engine that is a separate device from a processing core of the electronic device. That is, the DMA engine may be the first DMA engine described above. Or, for example, the first DMA device and/or the second DMA device may be a DMA engine included in the processing core of the electronic device. That is, the first DMA device and/or the second DMA device may be the second DMA engine or the third DMA engine described above. For example, as described above, the electronic device may include a CP, a main memory, at least one processing core, a first DMA device and/or an L2 cache.

For example, the waiting time of the first DMA operation may be derived as a sum of predicted execution times of computation tasks performed before the first computation task among waiting computation tasks. Also, for example, the waiting time of the second DMA operation can be derived as a sum of predicted execution times of computation tasks performed before the second computation task among the waiting computational tasks.

The command processor derives a Multiple Outstanding (MO) value of the first DMA operation and a MO value of the second DMA operation based on the waiting time of the first DMA operation and the waiting time of the second DMA operation (S810). For example, the MO value of the first DMA operation and the MO value of the second DMA operation may be derived based on a ratio of the waiting time of the first DMA operation and the waiting time of the second DMA operation.

Specifically, for example, the MO value of the first DMA operation and the MO value of the second DMA operation may be derived based on a ratio of a reciprocal of the waiting time of the first DMA operation and a reciprocal of the waiting time of the second DMA operation.

For example, the MO value of the first DMA operation may be derived by multiplying a maximum MO value of the first DMA operation, by a value obtained by dividing the reciprocal of the waiting time of the first DMA operation by a sum of the reciprocal of the waiting time of the first DMA operation and the reciprocal of the waiting time of the second DMA operation. For example, the MO value of the first DMA operation may be derived based on the equation 1 described above. Alternatively, for example, when the waiting time of the first DMA operation is greater than the waiting time of the second DMA operation, the MO value of the first DMA operation may be derived by multiplying the maximum MO value of the first DMA operation by a value obtained by dividing the reciprocal of the waiting time of the first DMA operation by the sum of the reciprocal of the waiting time of the first DMA operation and the reciprocal of the waiting time of the second DMA operation. For example, when the waiting time of the first DMA operation is greater than the waiting time of the second DMA operation, the MO value of the second DMA operation may be derived as a maximum MO value of the second DMA operation, and the MO value of the first DMA operation may be derived by multiplying the maximum MO value of the first DMA operation by a value obtained by dividing the reciprocal of the waiting time of the first DMA operation by the sum of the reciprocal of the waiting time of the first DMA operation and the reciprocal of the waiting time of the second DMA operation.

In addition, for example, the MO value of the second DMA operation may be derived by multiplying a maximum MO value of the second DMA operation, by a value obtained by dividing a reciprocal of the waiting time of the second DMA operation by a sum of a reciprocal of the waiting time of the first DMA operation and the reciprocal of the waiting time of the second DMA operation. For example, the MO value of the second DMA operation may be derived based on the equation 1 described above.

Alternatively, for example, when the waiting time of the second DMA operation is greater than the waiting time of the first DMA operation, the MO value of the second DMA operation may be derived by multiplying the maximum MO value of the second DMA operation by the value obtained by dividing the reciprocal of the waiting time of the second DMA operation by the sum of the reciprocal of the waiting time of the first DMA operation and the reciprocal of the waiting time of the second DMA operation. For example, when the waiting time of the second DMA operation is greater than the waiting time of the first DMA operation, the MO value of the first DMA operation may be derived as a maximum MO value of the first DMA operation, and the MO value of the second DMA operation may be derived by multiplying the maximum MO value of the second DMA operation by the value obtained by dividing the reciprocal of the waiting time of the second DMA operation by the sum of the reciprocal of the waiting time of the first DMA operation and the reciprocal of the waiting time of the second DMA operation.

For example, waiting times of a plurality of DMA operations may be derived, and MO values of the plurality of DMA operations may be derived based on a priority ratio of the waiting times of the plurality of DMA operations. The priority ratio may be a ratio of reciprocals of the waiting times. For example, a MO value of a nth DMA operation may be derived by multiplying a maximum MO value of the nth DMA operation by a value obtained by dividing a reciprocal of the waiting time of the nth DMA operation by a sum of the reciprocals of the waiting times of the plurality of DMA operations. For example, the MO value of the nth DMA operation may be derived based on the equation 1 described above. Or, for example, when the waiting time of the nth DMA operation is not the smallest, the MO value of the nth DMA operation may be derived by multiplying the maximum MO value of the nth DMA operation by a value obtained by dividing the reciprocal of the waiting time of the nth DMA operation by the sum of the reciprocals of the waiting times of the plurality of DMA operations.

Alternatively, for example, waiting times of a plurality of DMA operations may be derived, and only a DMA operation having a smallest waiting time among the waiting times of the plurality of DMA operations may be performed. That is, for example, the waiting times of the plurality of DMA operations may be derived, and MO values for DMA operations other than the DMA operation having the smallest waiting time among the waiting times of the plurality of DMA operations may be derived as 0. For example, when a waiting time of a nth DMA operation among the plurality of DMA operations is the smallest, MO values of DMA operations other than the nth DMA operation may be derived as 0. Through this, bandwidth may be concentrated on the DMA operation for the most urgent computation task, so that the urgent computation task may be performed quickly.

Alternatively, for example, waiting times of a plurality of DMA operations may be derived, priorities of the plurality of DMA operations may be derived based on the waiting times, and MO values of the plurality of DMA operations may be derived based on the priorities. For example, MO allocation ratios for N priorities for N DMA operations may be preset, and the priorities of the N DMA operations may be derived in order of small waiting time. Thereafter, a MO value of a nth DMA operation may be derived by multiplying a maximum MO value of the nth DMA operation by a MO allocation ratio value of a priority of the nth DMA operation. Specifically, for example, when the waiting time of the nth DMA operation is an a-th smallest among the waiting times of a plurality of DMA operations, the priority of the nth DMA operation may be derived as rank a, and the MO value of the nth DMA operation may be derived as a value obtained by multiplying the maximum MO value of the nth DMA operation by b which is preset as a MO allocation ratio value of the a-rank.

Meanwhile, for example, the maximum MO value of the first DMA operation may be set based on time it takes for a transaction of the first DMA operation to move from the first memory to the specific memory and return to the first memory. That is, for example, the maximum MO value of the first DMA operation may be set based on a transaction turnaround time between the first memory and the specific memory. The transaction turnaround time may represent the time it takes for a transaction of the first DMA operation to move from the first memory to the specific memory and return to the first memory.

In addition, for example, the maximum MO value of the second DMA operation may be set based on time it takes for a transaction of the second DMA operation to move from the second memory to the specific memory and return to the second memory. That is, for example, the maximum MO value of the second DMA operation may be set based on a transaction turnaround time between the second memory and the specific memory. The transaction turnaround time may represent the time it takes for a transaction of the second DMA operation to move from the second memory to the specific memory and return to the second memory.

Meanwhile, for example, the first DMA operation may include a first DMA read operation and a first DMA write operation. The first DMA read operation may indicate a read operation of the first DMA operation, and the first DMA write operation may indicate a write operation of the first DMA operation. The maximum MO value of the first DMA operation may include a maximum read MO value of the first DMA read operation and a maximum write MO value of the first DMA write operation, and the maximum read MO value and the maximum write MO value may be set respectively.

In addition, for example, the second DMA operation may include a second DMA read operation and a second DMA write operation. The second DMA read operation may indicate a read operation of the second DMA operation, and the second DMA write operation may indicate a write operation of the second DMA operation. The maximum MO value of the second DMA operation may include a maximum read MO value of the second DMA read operation and a maximum write MO value of the second DMA write operation, and the maximum read MO value and the maximum write MO value may be set respectively.

The first DMA device performs the first DMA operation based on the MO value of the first DMA operation, and the second DMA device performs the second DMA operation based on the MO value of the second DMA operation (S820).

For example, the first DMA device may transfer a transaction from the first memory to the specific memory based on the MO value of the first DMA operation. The transaction may be a read transaction or a write transaction.

Also, for example, the second DMA device may transfer a transaction from the first memory to the specific memory based on the MO value of the second DMA operation. The transaction may be a read transaction or a write transaction.

For example, the specific memory may be a main memory of the electronic device, and the first memory may be a L2 cache of the electronic device, a L1 cache configured in a processing core, or an internal buffer configured in a processing core. Or, for example, the specific memory may be a main memory of the electronic device, and the second memory may be a L2 cache of the electronic device, a L1 cache configured in a processing core, or an internal buffer configured in a processing core.

Meanwhile, for example, the first DMA device may perform the first DMA operation for a current computation task and perform the first DMA operation for a next computation task. After the first DMA operation for the current computation task is completed and before the first DMA operation for the next computation task starts, the waiting time of the first DMA operation may be updated, and the MO value of the first DMA operation and the MO value of the second DMA operation may be derived again based on the updated waiting time of the first DMA operation and the waiting time of the second DMA operation.

For example, when the first DMA operation for the current computation task is completed, the waiting time of the first DMA operation may be updated based on a computation task of a next order of the current computation task, and the MO value of the first DMA operation and the MO value of the second DMA operation may be derived based on the updated waiting time of the first DMA operation and the waiting time of the second DMA operation. Here, the computation task of the next order may be a computation task for the first DMA operation performed next to the first DMA operation for the current computation task.

Specifically, for example, when the first DMA operation for the first computation task is completed, the command processor may update the waiting time of the first DMA operation for the first DMA operation for a third computation task, and derive the MO value of the first DMA operation and the MO value of the second DMA operation based on the updated waiting time of the first DMA operation and the waiting time of the second DMA operation.

For example, the MO value of the first DMA operation may be derived by multiplying a maximum MO value of the first DMA operation, by a value obtained by dividing the reciprocal of the updated waiting time of the first DMA operation by a sum of the reciprocal of the updated waiting time of the first DMA operation and the reciprocal of the waiting time of the second DMA operation. For example, the MO value of the first DMA operation may be derived based on the equation 1 described above. Alternatively, for example, when the updated waiting time of the first DMA operation is greater than the waiting time of the second DMA operation, the MO value of the first DMA operation may be derived by multiplying the maximum MO value of the first DMA operation by a value obtained by dividing the reciprocal of the updated waiting time of the first DMA operation by the sum of the reciprocal of the updated waiting time of the first DMA operation and the reciprocal of the waiting time of the second DMA operation. Alternatively, for example, only the DMA operation having a smallest waiting time among the updated waiting time of the first DMA operation and the waiting time of the second DMA operation may be performed. That is, for example, a MO value for a DMA operation other than a DMA operation having a smallest waiting time among the updated waiting time of the first DMA operation and the waiting time of the second DMA operation can be derived as 0. Alternatively, for example, a MO allocation ratio for a first priority and a MO allocation ratio for a second priority may be preset, and priorities of the first DMA operation and the second DMA operation may be derived in order of small waiting time, and a MO value of a nth DMA operation may be derived by multiplying a maximum MO value of the nth DMA operation by a MO allocation ratio value of a priority of the nth DMA operation.

Thereafter, the first DMA device may perform the first DMA operation based on the MO value of the first DMA operation, and the second DMA device may perform the second DMA operation based on the MO value of the second DMA operation. Here, for example, the waiting time of the first DMA operation may be updated by a sum of predicted execution times of computation tasks performed before the third computation task among the waiting computation tasks.

In addition, for example, the second DMA device may perform the second DMA operation for a current computation task and perform the second DMA operation for a next computation task. After the second DMA operation for the current computation task is completed and before the second DMA operation for the next computation task starts, the waiting time of the second DMA operation may be updated, and the MO value of the first DMA operation and the MO value of the second DMA operation may be derived again based on the waiting time of the first DMA operation and the updated waiting time of the second DMA operation.

For example, when the second DMA operation for the current computation task is completed, the waiting time of the second DMA operation may be updated based on a computation task of a next order of the current computation task, and the MO value of the first DMA operation and the MO value of the second DMA operation may be derived based on the waiting time of the first DMA operation and the updated waiting time of the second DMA operation. Here, the computation task of the next order may be a computation task for the second DMA operation performed next to the second DMA operation for the current computation task.

Specifically, for example, when the second DMA operation for the second computation task is completed, the command processor may update the waiting time of the second DMA operation for the second DMA operation for a fourth computation task, and derive the MO value of the first DMA operation and the MO value of the second DMA operation based on the waiting time of the first DMA operation and the updated waiting time of the second DMA operation.

For example, the MO value of the second DMA operation may be derived by multiplying a maximum MO value of the second DMA operation, by a value obtained by dividing the reciprocal of the updated waiting time of the second DMA operation by a sum of the reciprocal of the waiting time of the first DMA operation and the reciprocal of the updated waiting time of the second DMA operation. For example, the MO value of the second DMA operation may be derived based on the equation 1 described above. Alternatively, for example, when the updated waiting time of the second DMA operation is greater than the waiting time of the first DMA operation, the MO value of the second DMA operation may be derived by multiplying the maximum MO value of the second DMA operation by a value obtained by dividing the reciprocal of the updated waiting time of the second DMA operation by the sum of the reciprocal of the waiting time of the first DMA operation and the reciprocal of the updated waiting time of the second DMA operation. Alternatively, for example, only the DMA operation having a smallest waiting time among the waiting time of the first DMA operation and the updated waiting time of the second DMA operation may be performed. That is, for example, a MO value for a DMA operation other than a DMA operation having a smallest waiting time among the waiting time of the first DMA operation and the updated waiting time of the second DMA operation may be derived as 0. Alternatively, for example, a MO allocation ratio for a first priority and a MO allocation ratio for a second priority may be preset, and priorities of the first DMA operation and the second DMA operation may be derived in order of small waiting time, and a MO value of a nth DMA operation may be derived by multiplying a maximum MO value of the nth DMA operation by a MO allocation ratio value of a priority of the nth DMA operation.

Thereafter, the first DMA device may perform the first DMA operation based on the MO value of the first DMA operation, and the second DMA device may perform the second DMA operation based on the MO value of the second DMA operation. Here, for example, the waiting time of the second DMA operation may be updated by a sum of predicted execution times of computation tasks performed before the fourth computation task among the waiting computation tasks.

Or, for example, even if a DMA operation for the current computation task is completed and a DMA operation for the next computation task is started, MO values of DMA operations may not be updated if the currently performing DMA operation is monopolizing the bandwidth. That is, for example, even when a DMA operation for the current computation task is completed and a DMA operation for the next computation task is started, if MO values of DMA operations other than the currently performing DMA operation are set to 0, the MO values of the DMA operations may not be updated.

For example, if MO values of DMA operations other than the second DMA operation currently being performed are set to 0 after the first DMA operation for the current computation task is completed and before the first DMA operation for the next computation task starts, the MO values of the DMA operations may not be updated. Or, for example, if MO values of DMA operations other than the first DMA operation currently being performed is set to 0 after the second DMA operation for the current computation task is completed and before the second DMA operation for the next computation task starts, the MO values of the DMA operations may not be updated.

Or, for example, when a DMA operation for a current computation task is completed and a DMA operation for a next computation task is started, if a waiting time of the DMA operation updated based on the next computation task is greater than a specific value, the MO values of the DMA operations may not be updated. That is, for example, when a DMA operation for a current computation task is completed and a DMA operation for a next computation task is started, the waiting time of the DMA operation may be updated, and it may be determined whether the updated waiting time of the DMA operation is greater than or equal to a specific value. When the waiting time is greater than the specific value, the MO values of the DMA operations may not be updated, and when the waiting time is less than the specific value, the MO values of the DMA operations may be updated. By reallocating MO values of DMA operations only when the updated waiting time is greater than or equal to the specific value, efficiency may be improved so that changes in the allocated bandwidth of the DMA operations occur only when necessary. Here, the specific value may be a preset value.

For example, when the first DMA operation for the current operation task is completed and before the first DMA operation for the next operation task starts, the waiting time of the first DMA operation may be updated, and it can be determined whether the updated waiting time of the first DMA operation is greater than or equal to a specific value. When the waiting time is greater than or equal to a specific value, a MO value of the first DMA operation and a MO value of the second DMA operation may not be updated, and when the waiting time is less than the specific value, the MO value of the first DMA operation and the MO value of the second DMA operation may be derived based on the updated waiting time of the first DMA operation and the waiting time of the second DMA operation. Alternatively, for example, after the second DMA operation for the current computation task is completed and before the second DMA operation for the next computation task starts, the waiting time of the second DMA operation may be updated, and it may be determined whether the updated waiting time of the second DMA operation is greater than or equal to a specific value. When the waiting time is greater than or equal to a specific value, the MO value of the first DMA operation and the MO value of the second DMA operation may not be updated, and when the waiting time is less than the specific value, the MO value of the first DMA operation and the MO value of the second DMA operation may be derived based on the updated waiting time of the second DMA operation and the waiting time of the first DMA operation.

Alternatively, for example, the MO values of the DMA operations may be updated even when the DMA operation for the current computation task is not completed or when the DMA operation for the next computation task is not started. That is, time at which the MO values of the DMA operations are updated based on the waiting times of the DMA operations is not limited to time at which the DMA operation for the current computation task is completed or time at which the DMA operation for the next computation task starts. For example, the MO values of the DMA operations may be updated based on the waiting times of the DMA operations at regular intervals. Alternatively, when a request for an update of MO values of the DMA operations is transmitted, the MO values of the DMA operations may be updated based on the waiting times of the DMA operations.

The data processing method and electronic device using a direct memory access (DMA) in an AI service providing system according to the embodiments described above may adjust allocated bandwidth by deriving MO values based on waiting times of DMA operations, thereby allocating a larger bandwidth to an urgent DMA operation, thereby improving the data transfer efficiency for computation tasks.

In addition, MO values may be derived by reflecting changed waiting time of the DMA operation whenever a DMA operation is completed and a new DMA operation starts, thereby improving the data transfer efficiency for computation tasks by reflecting the priority of the DMA operation in real time.

In addition, MO values may be derived by reflecting changed waiting time of the DMA operation whenever a DMA operation is completed and a new DMA operation starts, and the efficiency of performing the DMA operation may be improved by adaptively considering predicted execution time of the computation task.

Although the present disclosure described above has been described with reference to the embodiments illustrated in the drawings, these are merely exemplary, and those skilled in the art will understand that various modifications and variations of the embodiments are possible. That is, the scope of the present disclosure is not limited to the above-described embodiments, and various modifications and improvements made by those skilled in the art using the basic concept of the embodiments defined in the following claims also included in the scope of the embodiments. Therefore, the scope of the present disclosure is defined by the technical spirit of the appended claims.

What is claimed is:

1. A data processing method using a direct memory access (DMA), the method comprising:
deriving a waiting time of a first DMA operation for a first computation task and a waiting time of a second DMA operation for a second computation task;
deriving a Multiple Outstanding (MO) value of the first DMA operation and a MO value of the second DMA operation based on the waiting time of the first DMA operation and the waiting time of the second DMA operation, the MO value of a DMA operation representing a number of outstanding data transactions associated with the DMA operation for a plurality of computation tasks to be executed including the first computation task and the second computation task, wherein a ratio of the MO value of the first DMA operation to the MO value of the second DMA operation is adjusted based on a comparison of the waiting time of the first DMA operation and the waiting time of the second DMA operation to allocate more shared DMA bandwidth over a shared memory bus to the first DMA operation or the second DMA operation having the smaller waiting time; and
performing the first DMA operation based on the MO value of the first DMA operation, and performing the second DMA operation based on the MO value of the second DMA operation,
wherein the waiting time of the first DMA operation is derived as a sum of predicted execution times of computation tasks performed before the first computation task among waiting computation tasks, and
wherein the waiting time of the second DMA operation is derived as a sum of predicted execution times of computation tasks performed before the second computation task among the waiting computation tasks.

2. The method of claim 1, wherein the first DMA operation is an operation in which data for the first computation task between a first memory and a specific memory is transferred by a first DMA device, and
wherein the second DMA operation is an operation in which data for the second computation task between a second memory and the specific memory is transferred by a second DMA device.

3. The method of claim 2, wherein the MO value of the first DMA operation and the MO value of the second DMA operation are derived based on a ratio of a reciprocal of the waiting time of the first DMA operation and a reciprocal of the waiting time of the second DMA operation.

4. The method of claim 3, wherein the MO value of the first DMA operation is derived by multiplying a maximum MO value of the first DMA operation, by a value obtained by dividing the reciprocal of the waiting time of the first DMA operation by a sum of the reciprocal of the waiting time of the first DMA operation and the reciprocal of the waiting time of the second DMA operation.

5. The method of claim 4, wherein the maximum MO value of the first DMA operation is set based on time it takes for a transaction of the first DMA operation to move from the first memory to the specific memory and return to the first memory.

6. The method of claim 4, wherein the maximum MO value of the second DMA operation is set based on time it takes for a transaction of the second DMA operation to move from the second memory to the specific memory and return to the second memory.

7. The method of claim 3, wherein the MO value of the second DMA operation is derived by multiplying a maximum MO value of the second DMA operation, by a value obtained by dividing the reciprocal of the waiting time of the second DMA operation by a sum of the reciprocal of the waiting time of the first DMA operation and the reciprocal of the waiting time of the second DMA operation.

8. The method of claim 3, wherein the method further comprises:

when the first DMA operation for the first computation task is completed, updating the waiting time of the first DMA operation for the first DMA operation for a third computation task;

deriving the MO value of the first DMA operation and the MO value of the second DMA operation based on the updated waiting time of the first DMA operation and the waiting time of the second DMA operation; and performing the first DMA operation based on the MO value of the first DMA operation, and performing the second DMA operation based on the MO value of the second DMA operation, wherein the waiting time of the first DMA operation is updated as a sum of predicted execution times of computation tasks performed before the third computation task among the waiting computation tasks.

9. The method of claim 3, wherein the method further comprises:

when the second DMA operation for the second computation task is completed, updating the waiting time of the second DMA operation for the second DMA operation for a fourth computation task;

deriving the MO value of the first DMA operation and the MO value of the second DMA operation based on the waiting time of the first DMA operation and the updated waiting time of the second DMA operation; and performing the first DMA operation based on the MO value of the first DMA operation, and performing the second DMA operation based on the MO value of the second DMA operation, wherein the waiting time of the second DMA operation is updated as a sum of predicted execution times of computation tasks performed before the fourth computation task among the waiting computation tasks.

10. The method of claim 3, wherein when the first DMA operation for a current computation task is completed, the waiting time of the first DMA operation is updated based a computation task of a next order of the current computation task, and the MO value of the first DMA operation and the MO value of the second DMA operation are derived based on the updated waiting time of the first DMA operation and the waiting time of the second DMA operation, and wherein the computation task of the next order is a computation task for the first DMA operation performed after the first DMA operation for the current computation task.

11. The method of claim 3, wherein when the second DMA operation for a current computation task is completed, the waiting time of the second DMA operation is updated based a computation task of a next order of the current computation task, and the MO value of the first DMA operation and the MO value of the second DMA operation are derived based on the waiting time of the first DMA operation and the updated waiting time of the second DMA operation, and wherein the computation task of the next order is a computation task for the second DMA operation performed after the second DMA operation for the current computation task.

12. An electronic device, comprising:

a command processor (CP) that operates firmware for a direct memory access (DMA) operation;

a first DMA device performing a first DMA operation between a first memory and a specific memory; and a second DMA device performing a second DMA operation between a second memory and the specific memory, wherein the CP derives a waiting time of the first DMA operation for a first computation task and a waiting time of the second DMA operation for a second computation task, derives a Multiple Outstanding (MO) value of the first DMA operation and a MO value of the second DMA operation based on the waiting time of the first DMA operation and the waiting time of the second DMA operation, the MO value of a DMA operation representing a number of outstanding data transactions associated with the DMA operation for a plurality of computation tasks to be executed including the first computation task and the second computation task, wherein a ratio of the MO value of the first DMA operation to the MO value of the second DMA operation is adjusted based on a comparison of the waiting time of the first DMA operation and the waiting time of the second DMA operation to allocate more shared DMA bandwidth over a shared memory bus to the first DMA operation or the second DMA operation having the smaller waiting time, wherein the first DMA device performs the first DMA operation based on the MO value of the first DMA operation, wherein the second DMA device performs the second DMA operation based on the MO value of the second DMA operation, wherein the waiting time of the first DMA operation is derived as a sum of predicted execution times of computation tasks performed before the first computation task among waiting computation tasks, and wherein the waiting time of the second DMA operation is derived as a sum of predicted execution times of computation tasks performed before the second computation task among the waiting computation tasks.

13. The electronic device of claim 12, wherein the MO value of the first DMA operation and the MO value of the second DMA operation are derived based on a ratio of a reciprocal of the waiting time of the first DMA operation and a reciprocal of the waiting time of the second DMA operation.

14. The electronic device of claim 13, wherein the MO value of the first DMA operation is derived by multiplying a maximum MO value of the first DMA operation, by a value obtained by dividing the reciprocal of the waiting time of the first DMA operation by a sum of the reciprocal of the waiting time of the first DMA operation and the reciprocal of the waiting time of the second DMA operation.

15. The electronic device of claim 14, wherein the maximum MO value of the first DMA operation is set based on time it takes for a transaction of the first DMA operation to move from the first memory to the specific memory and return to the first memory.

16. The electronic device of claim 13, wherein the MO value of the second DMA operation is derived by multiplying a maximum MO value of the second DMA operation, by a value obtained by dividing the reciprocal of the waiting time of the second DMA operation by a sum of the reciprocal of the waiting time of the first DMA operation and the reciprocal of the waiting time of the second DMA operation.

17. The electronic device of claim 13, wherein when the first DMA operation for the first computation task is completed, the CP updates the waiting time of the first DMA operation for the first DMA operation for a third computation task, derives the MO value of the first DMA operation and the MO value of the second DMA operation based on the updated waiting time of the first DMA operation and the waiting time of the second DMA operation, and wherein the waiting time of the first DMA operation is updated as a sum of predicted execution times of computation tasks performed before the third computation task among the waiting computation tasks.

18. The electronic device of claim 13, wherein when the second DMA operation for the second computation task is completed, the CP updates the waiting time of the second DMA operation for the second DMA operation for a fourth computation task, derives the MO value of the first DMA operation and the MO value of the second DMA operation based on the waiting time of the first DMA operation and the updated waiting time of the second DMA operation, and wherein the waiting time of the second DMA operation is updated as a sum of predicted execution times of computation tasks performed before the fourth computation task among the waiting computation tasks.

19. The electronic device of claim 13, wherein when the first DMA operation for a current computation task is completed, the waiting time of the first DMA operation is updated based a computation task of a next order of the current computation task, and the MO value of the first DMA operation and the MO value of the second DMA operation are derived based on the updated waiting time of the first DMA operation and the waiting time of the second DMA operation, and wherein the computation task of the next order is a computation task for the first DMA operation performed after the first DMA operation for the current computation task.

20. The electronic device of claim 13, wherein when the second DMA operation for a current computation task is completed, the waiting time of the second DMA operation is updated based a computation task of a next order of the current computation task, and the MO value of the first DMA operation and the MO value of the second DMA operation are derived based on the waiting time of the first DMA operation and the updated waiting time of the second DMA operation, and wherein the computation task of the next order is a computation task for the second DMA operation performed after the second DMA operation for the current computation task.

* * * * *